UNITED STATES PATENT OFFICE.

WALTER DAHLE, OF BIRKENWERDER, NEAR BERLIN, GERMANY.

PROCESS OF PRESERVING FRESH MEAT AND FISH.

1,032,885. Specification of Letters Patent. Patented July 16, 1912.

No Drawing. Application filed September 27, 1911. Serial No. 651,607.

*To all whom it may concern:*

Be it known that I, WALTER DAHLE, a subject of the German Emperor, and residing at Birkenwerder, near Berlin, Germany, have invented a certain new and useful Improved Process of Preserving Fresh Meat and Fish, of which the following is a specification.

The present process of preserving fresh meat and fish consists in the combination of various operations by means of which a specially good result is obtained.

It has heretofore been proposed to coat the surface of meat with highly heated fat. In this manner not only is further treatment of the meat prevented, but the meat is not preserved by the coating of fat alone.

According to the present process the preserving operation is begun by putting the meat or fish into boiling water and thereby providing it with a thin envelop or coating of coagulated albumin, whereupon the meat or fish is put into a solution of acetic acid. It is true that an acetic acid solution is well-known as a preserving agent, but in the present case it not only acts as a preserving agent, but also renders the previously produced protective envelop more durable, whereby the preserving action of the envelop is made more effective. Owing to the envelop being first formed, on the other hand, the acetic acid is prevented from penetrating too far. The meat or the like thus treated is then put into a solution of sodium chlorid. It has likewise been known heretofore to employ a solution of sodium chlorid for preserving purposes, but in general the same must act for a long time, whereas in the present case, in consequence of the preliminary treatment of the meat or the like, the solution need act for only a short time and the taste of the meat is prevented from being impaired.

My process is carried into practice as follows:—The piece of fresh meat or fish of any desired size to be preserved is put for one second into vigorously boiling water, whereupon it is immersed likewise for one second into a more or less saturated solution of acetic acid, preferably a 15% solution, although a 5% solution exercises a preserving action. The piece is then put into a saturated solution of sodium chlorid which has been previously boiled and allowed to cool, and is left therein for from one to two minutes. The piece of meat or the like thus treated is now hung up to be dried on a hook which had been sterilized in a flame and placed into the piece before it was treated. The temperature of the air in which the suspended piece of meat or fish dries may be the usual temperature of a room, say about 15° C., or even higher according as the hard coating or skin is to be formed rapidly on the surface of the meat or fish.

When the meat is dried in a chamber having the temperature of a room, after 24 hours a thick skin about ¼ to ½ mm. thick is formed containing hardly any microbes as those which were present on the surface have for the most part been killed by the described treatment. Any microbes still present and particularly the spores of certain bacteria are situated very unfavorably as regards their propagation, and cannot penetrate through the hard skin saturated with salt and acetic acid into the interior of the piece and attack the meat.

After the meat or the like has been provided in the described manner with a thick skin it can be stored in dry airy chambers for a somewhat long time, say for several weeks or months. When wrapped in ordinary packing-paper and sacking or packed in a dry box, the meat or fish can be conveyed a long distance in good condition.

The acetic acid is quite non-injurious to the health of the consumer especially as it volatilizes in the course of time. Other acids or substances which cause albumin to coagulate may, however, be employed for the same purpose.

Now it has been found that when meat is cut up and the tubes or ducts of hollow bones are exposed, bacteria which are not kept away or killed by the above-described process enter such tubes or ducts. It is therefore necessary to subject these parts to an additional treatment. This consists in sealing the tubular bones at their open ends with a readily melting mass which congeals at an ordinary temperature, such as paraffin, wax or the like, or with a plastic mass, such as rubber, cork or the like. Such sealing masses are suitably sterilized or otherwise suitably prepared.

I claim:—

1. The hereindescribed process of preserving fresh meat and fish which consists in firstly treating the piece of meat or fish for a short time with boiling water, whereby a thin coating or envelop of coagulated albumin is formed on the piece, in then immersing the piece of meat or fish in a solution of acetic acid, in subsequently placing the piece of meat or fish thus treated for approximately one to two minutes into a cold solution of salt, in drying the piece of meat or fish, and then sealing the ends of the tubular bones terminating at the surface of the meat.

2. The hereindescribed process of preserving fresh meat and fish, which consists in firstly treating a piece of meat or fish for a short time with boiling water, whereby a thin coating or envelop of coagulated albumin is formed on the piece, in then placing the meat or fish into a solution of acetic acid containing upward of five per centum of acid, in subsequently placing the piece of meat or fish thus treated for approximately one or two minutes in a cold solution of salt, in drying the piece of meat or fish thus treated, and in then sealing the ends of the tubular bones terminating at the surface of the meat with a readily melting mass which congeals at an ordinary temperature.

In testimony whereof, I affix my signature in the presence of two witnesses.

WALTER DAHLE.

Witnesses:
 WOLDEMAR HAUPT,
 BRUNO BRUER.

Copies of this patent may be obtained for five cents each, by addressing the "Commissioner of Patents, Washington, D. C."